United States Patent [19]

Harter

[11] 4,456,821

[45] Jun. 26, 1984

[54] TIME/SPEED/DISTANCE SLIDE RULE

[76] Inventor: Burleigh W. Harter, 823 Canyon Rd., Redwood City, Calif. 94062

[21] Appl. No.: 385,070

[22] Filed: Jun. 4, 1982

[51] Int. Cl.$^3$ .................. G01C 23/00; G06C 1/00
[52] U.S. Cl. .................. 235/78 R; 33/1.5 D; 235/78 N; 235/61 NV; 235/85 R; 235/88 N; 235/89 R
[58] Field of Search ............ 235/61 NV, 78 N, 85 R, 235/88 N, 89 R; 33/1.5 D

[56] References Cited

U.S. PATENT DOCUMENTS

| | | | |
|---|---|---|---|
| 2,545,935 | 3/1951 | Warner | 33/1.5 D |
| 3,279,695 | 10/1966 | Krause | 235/78 N |
| 3,373,932 | 3/1968 | Copeland | 235/88 N |
| 3,496,640 | 2/1970 | Warner | 33/1.5 SD |
| 3,514,582 | 5/1970 | Sanderson | 235/89 R |

Primary Examiner—L. T. Hix
Assistant Examiner—Della Rutledge

[57] ABSTRACT

A slide rule for solving time/speed/distance problems where distances are measured with a single or universal ruler applicable to all charts or maps regardless of scale. Result is achieved by printing alongside time entries on the slide rule a row of appropriately-spaced numbers constituting indicia of chart or map scale, and which has a range encompassing the largest and smallest scales of charts or maps which are likely to be encountered. When such numbers are properly positioned, it is necessary only to set chart scale opposite speed made good, after which running time will always appear opposite distance travelled, and vice versa. This device eliminates the need to use dividers and mileage or latitude scale, and thus obviates the intermediate steps which their use entails.

7 Claims, 5 Drawing Figures

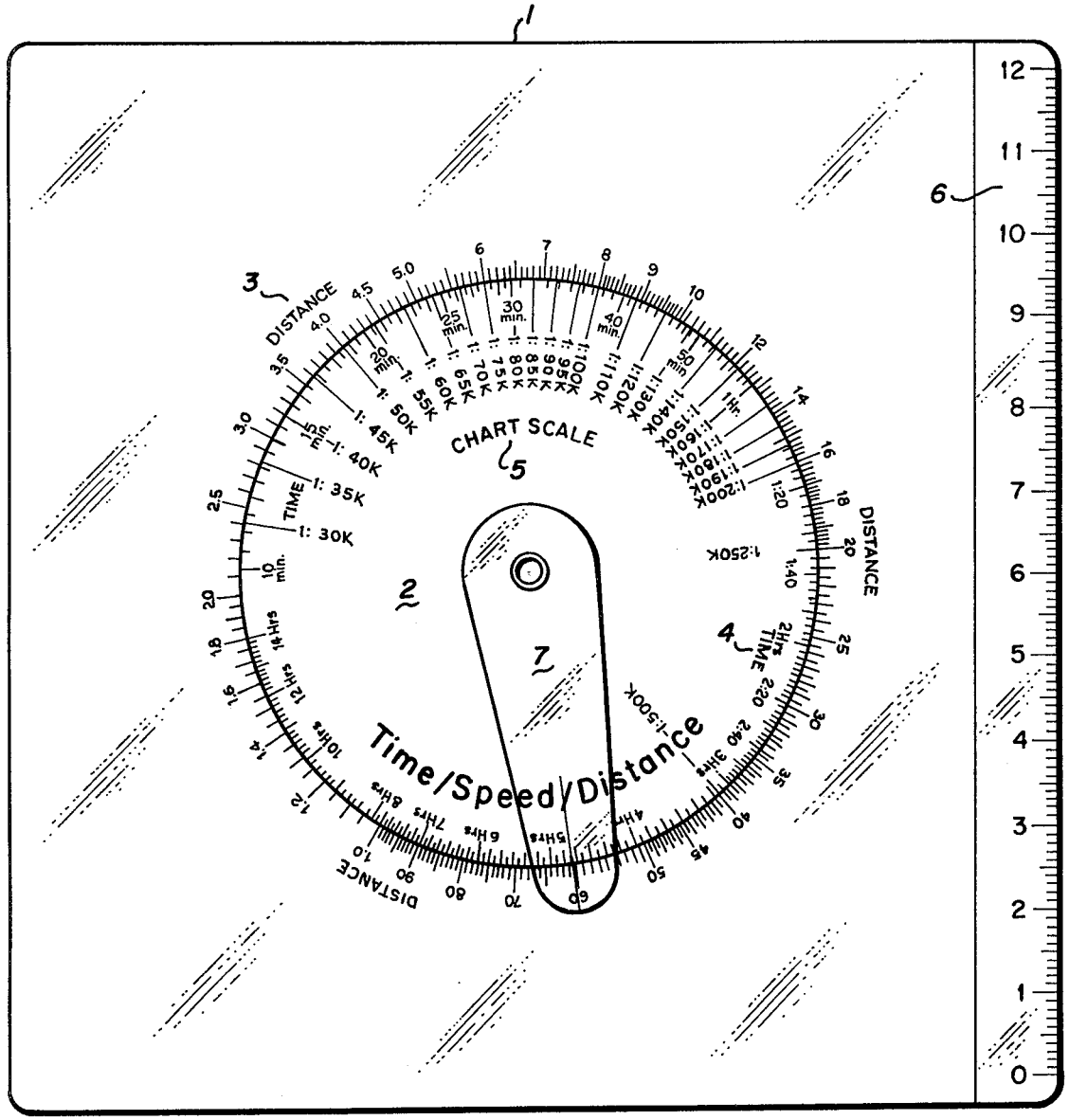
Fig_1
Fig_2

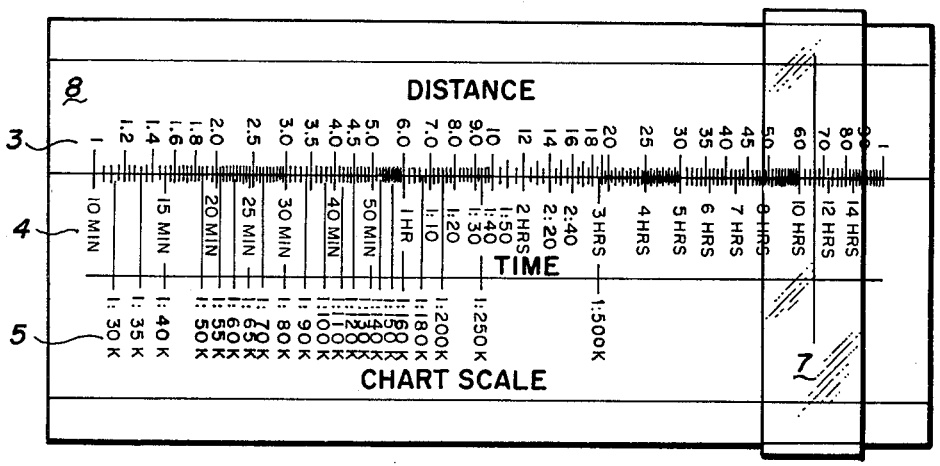
Fig_3
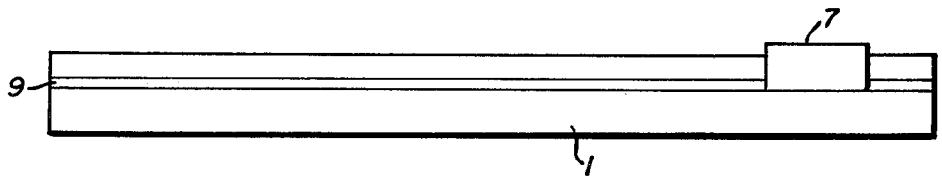
Fig_4
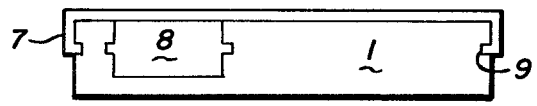
Fig_5

TIME/SPEED/DISTANCE SLIDE RULE

BACKGROUND

The common slide rule, employing opposed ratio or logarithmic scales, has been in use for more than a hundred years. Even today, when micro-chips have replaced this device in most computing assignments, there still are applications where the slide rule has marketable advantages, and for this reason it will no doubt continue to be improved in a manner similar to that disclosed by the present invention.

Mechanically the slide rule has seen few changes or improvements over the decades. The original device, which carried a movable scale on a slidable member locked into a groove in a fixed member presenting an opposed scale, was improved by the introduction of circular or disc-shaped members coaxially mounted and which permitted elongation of the scales. Moving hairline cursors, slidable and rotatable, some with magnifying lenses, were added to facilitate reading. Discs were added. And windows were placed in some discs. Little else of real substance appears in the voluminous patent records. Purely mechanical improvements, in other words, have been few in number and in all probability will be even less evident in the future.

The hundreds of patentable improvements to the slide rule which are disclosed by a search of the records consist of the addition of new or modified scales to mechanical devices previously created by others. In most cases the patentable improvement has consisted of the adding of a single row of numbers to simplify the solving of a specific problem. The present invention is of this nature. A search has disclosed no prior slide rule which has printed thereon indicia of scale of chart or map and which in so doing eliminates the need to use dividers and latitude or mileage scale in solving time/speed/distance problems.

SUMMARY

Prior art has required measurement of distances across a chart or map with draftman's dividers and subsequent conversion to miles by carrying dividers to a mileage or latitude scale printed on such chart or map, each minute of arc of latitude being equal to one nautical mile; or by using a multiplicity of distance-measuring rulers, each calibrated to a given scale of chart. The present invention, to repeat, measures distances across chart or map by using a single ruler or scale with fixed and equally-spaced graduations printed thereon. Since this ruler in preferred practice is a part of a see-through overlay which is continuously in place against the face of the chart or map, reading of distances therefrom effects a substantial time saving, particularly in such applications as marine piloting where time/speed/distance problems are solved with high frequency.

Since the fixed space between graduations on the described ruler represents a greater distance in miles on a chart or map covering a large geographic area (so-called "small-scale" chart or map) than where a small geographic area is involved, it is necessary to modify the slide rule (or other computing device) which is used to solve time/speed/distance problems. The present modification adds alongside the time entries a row of figures consisting of indicia of chart scale.

Even where distances are measured with dividers and mileage or latitude scale (or by a ruler calibrated to chart scale) it is necessary to set the rotating disc on a circular slide rule, or the time scale on any slide rule, to speed made good. Under prior art sixty minutes, or one hour, on the time scale was set opposite to that figure on the distance scale which represented distance traversed in one hour, the sixty minute entry on the time scale being ordinarily identified by an arrow, triangular pointer, a window in the rotating disc, or other visual aid. Under the present invention the operator sets scale of chart-instead of sixty minutes—opposite to distance which equals speed in miles per hour. Such manipulation of the time scale under the present invention is in no way less convenient nor more time consuming than when the sixty minute entry is set opposite to speed, and it does save overall time and effort by eliminating the intermediate steps requiring use of dividers and mileage or latitude scale, or finding and applying a ruler calibrated to chart scale.

Many spacings can be used in designing the distance-measuring ruler. In constructing the operating model of the present invention the space between printed entries on the ruler was arbitrarily set equal to one nautical mile on a chart with scale of 1:160,000. When the operator is using a chart with such scale, then, the slide rule is set exactly as under prior art (with sixty minutes opposite speed in miles per hour), and the operator then proceeds to read distance traversed opposite running time, and vice versa. If the operator is using the popular "small-craft" chart with scale of 1:80,000, on the other hand, it is necessary to set thirty minutes opposite to speed in miles per hour, since it will take only thirty minutes to cover a distance equal to that which is found between entries on the distance ruler. There is therefore printed on the slide rule an entry alongside thirty minutes (see FIG. 1) which indicates that this time value is to be set opposite speed when a 1:80,000 chart is in use. To determine the corresponding entry for other charts, as illustrated further by FIG. 1, it is necessary only to multiply chart scale by 0.000375, or by 60/160,000.

BRIEF DESCRIPTION OF VIEWS

FIG. 1 is a top or plan view of a circular slide rule depicting one embodiment of the present invention, with scales set for speed made good of 3.2 mph and chart or map scale of 1:40,000.

FIG. 2 is an edge or cross-section view of the slide rule shown in FIG. 1.

FIG. 3 is a top or plan view of a straight slide rule with the improved scales printed thereon.

FIG. 4 is a side view of the straight slide rule.

FIG. 5 is an end, or cross-section, view of the straight slide rule.

EXTENDED DESCRIPTION OF PREFERRED EMBODIMENT

FIGS. 1 and 2 show one embodiment of the invention, preferred construction material with present state of the art being plastic. A circular and rotatable disc 2 is coaxially mounted on a base plate 1, the latter being shown as a square member with rounded corners and carrying a distance-measuring ruler 6 printed along one edge. An alternative would employ a circular or disc-shaped base plate 1 with diameter only sufficiently larger than that of the rotating upper disc 2 to permit the distance scale 3 to be visible to the user. Under this option the distance measuring ruler would be a part of a separate see-through overlay which itself would serve a multiplicity of purposes. Still another possible embodiment uses a larger rectangular base plate 1 with sufficient space to have printed thereon a comprehensive set of operating instructions, with the distance-measuring ruler 6 being printed on one or both of the long margins, and with the upper rotating disc 2 being mounted in the lower right corner or at any other convenient place. A moving cursor 7 could be employed with any of the various options without changing the nature of the invention. Many other embodiments not specifically mentioned here also fall within the purview of the invention.

The upper rotating disc 2 has printed thereon a conventional time scale 4, and alongside such time scale it has printed a row of numbers consisting of indicia of chart scale 5. In practice the upper disc 2 is rotated by the operator until the scale of the chart in use is opposite to speed in miles per hour on the fixed distance scale 3. He then reads required running time on the time scale 4 opposite distance traversed on the distance scale 3, and vice versa. If the scale of the chart in use is not printed on the upper rotating disc 2, and if its position cannot be conveniently or accurately interpolated by inspection, its precise location can be computed by multiplying chart scale by 0.000375 (where graduations on ruler equal one mile on chart with scale of 1:160,000), and preferred practice in such case is to ink the resulting time value onto the margin of such chart for permanent use thereafter.

FIGS. 3, 4, and 5 present another of several possible embodiments of this invention, the option here being a straight, as opposed to circular, slide rule. FIG. 3 shows a base member 1 which is comparable to the base plate 1 on the circular slide rule, FIG. 1. In FIG. 3, however, time 4 and chart indicia 5 have, solely for convenience, been printed on the fixed member 1, whereas the distance scale 3 has been printed on the movable or sliding member 8. In FIGS. 3, 4, and 5 movable or sliding hairline cursor 7 is locked into groove 9, whereas the hairline cursor 7 in FIG. 1 rotates about the common axis. Specific procedures for using the straight slide rule in practice are so similar to those described for the circular slide rule that they need not be repeated.

It is evident that this slide rule, in any of its various options, modifications, or embodiments, may be used in the conventional way (as when distances are measured with dividers and mileage or latitude scale) by setting sixty minutes opposite speed in miles per hour. In such cases the indicia of chart scale are simply disregarded.

I claim:

1. A time/speed/distance slide rule comprised of the following logarithmic scales: a fixed scale indicating distance traversed, a moving scale indicating elapsed time, and a moving scale indicating indicia of scale of chart or map in use, entries on said fixed scale juxtaposed to entries on said moving scale.

2. A time/speed/distance slide rule of claim 1 wherein there is: a base plate, a cooperating and rotating disc coaxially mounted on the base plate, a distance traversed scale printed on said base plate and juxtaposed to entries on said rotating disc, a time scale printed on said rotating disc and juxtaposed to entries on the fixed distance scale on said base plate, and a row of numbers constituting indicia of scale of chart or map printed on said rotating disc and juxtaposed to entries on said fixed distance scale printed on said base plate.

3. The time/speed/distance slide rule of claim 1 wherein there is: a base plate with coaxially mounted cooperating and rotating upper disc, a time scale and a row of numbers constituting indicia of scale of chart or map printed on said base plate and juxtaposed to entires on said rotating disc, a distance traversed scale printed on said rotating disc and juxtaposed to entires on said base plate.

4. The time/speed/distance slide rule of claim 1 wherein there is: a body or frame with a distance scale printed thereon, a sliding member movable longitudinally relative to and supported by said body or frame and carrying scales printed thereon indicating elapsed time and indicia of chart scale.

5. The time/speed/distance slide rule of claim 1 wherein there is: a body or frame with scales printed thereon for elapsed time and indicia of chart scale, a sliding member movable longitudinally relative to and supported by said body or frame and with a distance scale printed thereon.

6. The time/speed/distance slide rule of claim 2 wherein there is: a rotatable cursor added thereto.

7. The time/speed/distance slide rule of claim 4 wherein there is: a slidable mounted hairline cursor supported by said body or frame for longitudinal movement therealong.

* * * * *